Dec. 6, 1927.  
C. ZIEGLER  
1,651,571  
BRICK MOLDING PROCESS AND APPARATUS  
Filed Jan. 7, 1926
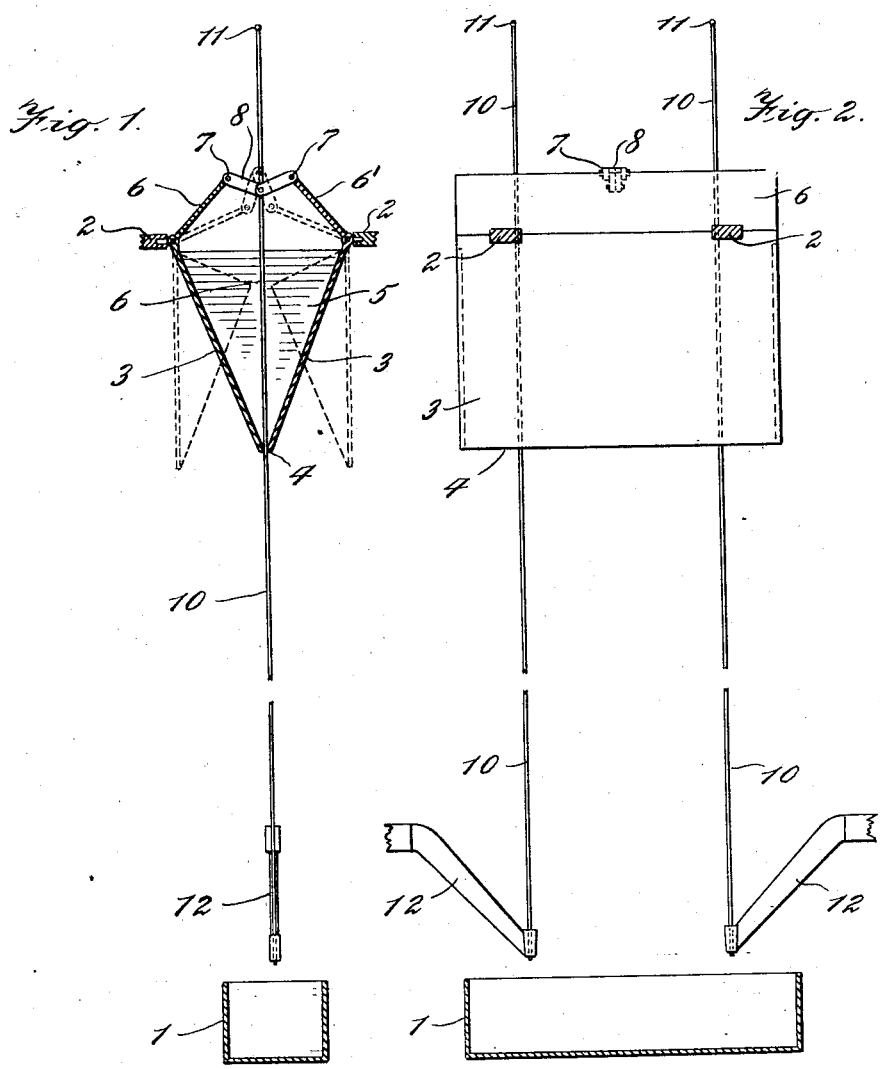
Crawford Ziegler, INVENTOR.  
BY  
Gifford & Scull  
ATTORNEYS.

Patented Dec. 6, 1927.

1,651,571

UNITED STATES PATENT OFFICE.

CRAWFORD ZIEGLER, OF COOSADA, ALABAMA, ASSIGNOR, BY MESNE ASSIGNMENTS, TO CHARLES L. NORTON, OF CAMBRIDGE, MASSACHUSETTS.

BRICK-MOLDING PROCESS AND APPARATUS.

Application filed January 7, 1926. Serial No. 79,721.

This invention relates to a process and apparatus for molding material such as ceramics, by dropping the same into a mold with sufficient force to cause the material to assume the exact shape of the inside of the mold. It relates more particularly to the molding of brick by dropping the mass of brick-forming material into the brick mold.

Heretofore it has been common in molding brick in this manner to first provide the batch of material in a non-plastic or sandy condition and drop the same through a short distance into the mold, the inertia of the same being sufficient to cause the particles to spread enough to fill the corners of the mold. It is sometimes desirable to mold brick for certain purposes from materials that are plastic or are in a somewhat sticky form, with a correspondingly less ease of readiness of flow. In such instances, it is necessary to drop the material through a considerably greater distance in order for the same to attain sufficient velocity to cause the less plastic mass to assume the shape of the inside of the mold when it falls thereinto. It has been found desirable to have the falling batch in such shape that the lower side or portion thereof is somewhat pointed or sharpened, so that the same will spread uniformly and satisfactorily in the mold when it strikes the same. When dropping batches through long distances, there is a decided tendency for the same to turn in its fall so that the portion that is of the desired shape does not first strike the bottom of the mold.

By the present invention, the tendency for the batch of material to turn in its fall is obviated, and material can be dropped through any desired distance without danger of the same turning and, therefore, somewhat dry material or material having little plasticity can be satisfactorily molded by this method.

The invention will be understood from the description in connection with the accompanying drawings, in which a device is illustrated for practicing the invention. In the drawings, Fig. 1 indicates an edge view of the device in elevation, and Fig. 2 a side view of the same.

Reference character 1 indicates a mold for brick or the like, the inside of which is made of the shape which it is desired that the article to be molded should assume. A hopper or container is mounted directly above the mold 1, and comprises two sides hinged at 2. The hinged sides have lower portions 3 that contact with each other along their bottom edges 4, and end portions 5 that contact along the line 6, so as to form a receptacle when the side portions 3 are in the position indicated in Fig. 1. Each one of the hinged portions also comprises rigid upper members 6, along whose upper edges 7 is hinged a toggle 8, which toggle can bend in one direction only to the position shown in Fig. 1, while it can collapse in the other direction. Guides 10 which may be made of wire, for example, are anchored at fixed points 11 at their upper end, and pass through the hopper between the lower edges 4 of the sides 3, and have their lower ends anchored by means of the clamps or holders 12, that are fixed in position so as to keep the wires taut.

The operation is as follows: A sufficient amount of the material that is to be molded is placed in the hopper to form one of the articles, such as a brick, for example, and the portions of the wires or guides 10 inside the hopper become embedded in this batch of material, so that when the sides 3 are opened by pulling upward on the toggle 8 into the dotted line position, as shown in Fig. 1, the batch of material drops downwardly and slides along the guides 10, so that it is prevented from turning while it is falling, and the pointed edge thereof strikes the bottom of the mold in the desired manner, so that the material spreads laterally and closely fills all corners and crevices of the inside of the mold to make the batch exactly conform to the shape of the mold.

It is obvious that instead of having wires mounted as guides, in the manner above described, so that the wires pass through the mass of the material, vertical guides such as rails or the like may be mounted in line with the edge of the hopper, and have smooth straight fins or flanges which merely project or cut into the edge of the batch of material, thus preventing it from turning. In the form illustrated in Figs. 1 and 2, the holders 12 will, of course, cut through the batch of material from the holes made by the wires 10 to the corresponding edges of the batch.

I claim:

1. The process of molding material which comprises segregating a batch of plastic material, dropping said batch unconfined into a mold, and guiding said batch to prevent it from turning while it is falling.

2. The process of molding brick which comprises segregating a batch of brick forming material in a plastic mass, dropping said batch unconfined into a mold with a relatively small portion thereof extending downwardly, and guiding said batch to prevent it from turning while it is falling.

3. In a molding device, a mold, a hopper thereabove, and an open guide from said hopper to said mold.

4. In a molding device, a mold, a hopper thereabove, and an open guide from said hopper to said mold along which material falling from said hopper to said mold slides.

5. In a molding device, a mold, a stationary receptacle in which batches of the material to be molded are segregated, and a smooth, straight guide from said receptacle to said mold.

6. In a molding device, a mold, a hopper thereabove, and a wire guide from said hopper to said mold.

CRAWFORD ZIEGLER.